June 23, 1942.　　　G. D. WHITE　　　2,287,156
SKIMMER
Filed Aug. 29, 1941
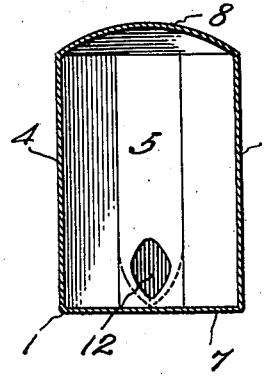
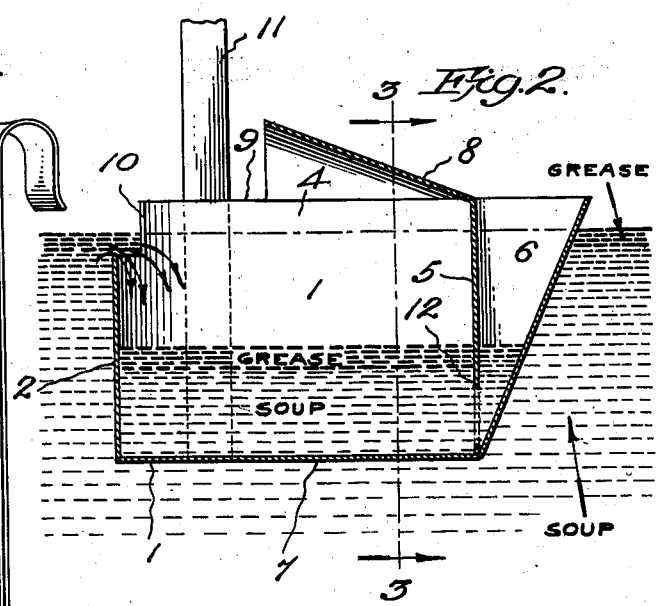
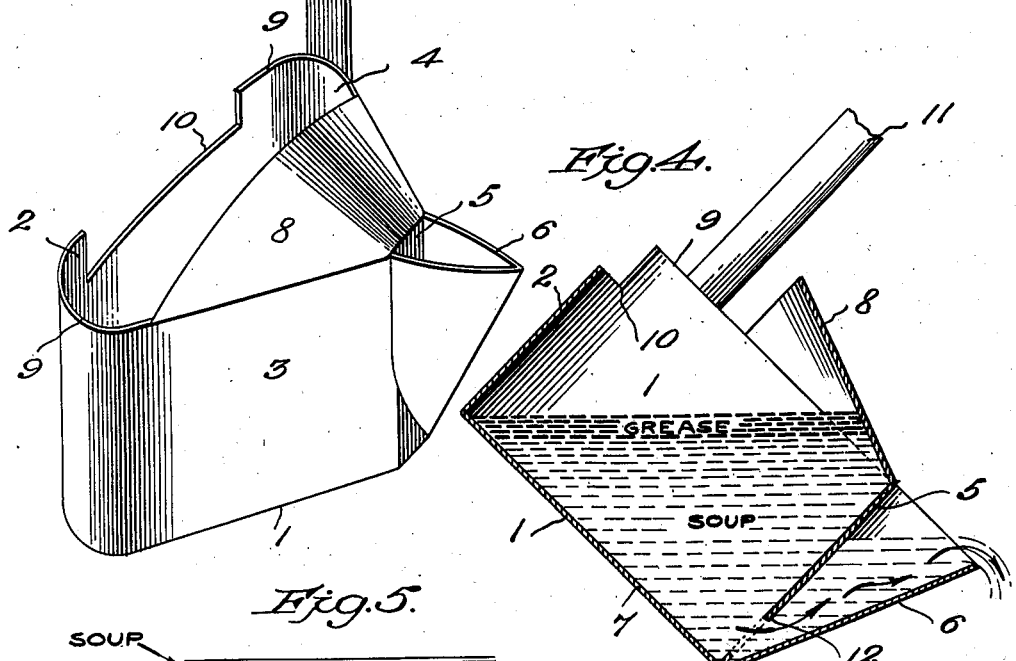
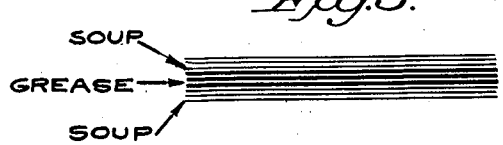
INVENTOR.
GEORGE D. WHITE
BY Cornelius Zahriskie
ATTORNEY Patented June 23, 1942

2,287,156

UNITED STATES PATENT OFFICE 2,287,156

SKIMMER

George D. White, Jersey City, N. J., assignor of one-half to Charles V. Holsey, Jersey City, N. J.

Application August 29, 1941, Serial No. 408,708

6 Claims. (Cl. 65—28)

This invention is a skimmer and while adapted for use generally with liquids which tend to stratify, it is particularly designed for use with soup.

The object of the invention is to provide a skimmer of novel construction which will efficiently separate liquids of different densities from the mass of which they form component parts.

Speaking generally, the skimmer of this invention comprises a cup-like receptacle provided at one side with a pouring spout, the greater portion of the height of which is isolated from the interior of the receptacle by a wall or baffle which extends to near the bottom of the receptacle, where an opening is provided between the interiors of these parts. At the side of the receptacle opposite the spout the wall of the receptacle is cut away at its upper edge so as to provide a liquid inlet, below the plane of the remainder of the top of the receptacle and the spout, so that, when the skimmer is depressed into a body of liquid, such liquid may flow into the receptacle through the cut away inlet, without flowing into the spout. The liquid which thus flows into the receptacle is adapted to stratify therein and the lower stratum may be thereafter discharged through the spout by tilting the receptacle. A hood is provided for that portion of the receptacle adjacent the spout to preclude liquid from flowing over the partition between the spout and the receptacle.

The invention embodies numerous novel features including, among others, the utilization of the cut away liquid inlet and the hood to which reference has been made, as well as the particular formation of the communicating opening between the interior of the receptacle and the spout and the function of which will be hereinafter explained.

The accompanying drawing illustrates one practical embodiment of the invention but the construction therein shown is to be understood as illustrative, only, and not as defining the limits of the invention.

Figure 1 is a perspective view showing the skimmer of the present invention in upright position.

Figure 2 is a transverse vertical section through the center of the skimmer showing the same partially immersed in a body of liquid to permit the liquid to flow into the receptacle.

Figure 3 is a section on the line 3—3 of Figure 2.

Figure 4 shows the skimmer tilted and in the act of discharging the lower stratum of a quantity of liquid contained therein.

Figure 5 is a schematic view showing the discharge of the liquid and the manner in which the component of lesser density serves to indicate its presence in the stream.

In the accompanying drawing, 1 indicates a receptacle, which may be made of any desired material, but is preferably fabricated from sheet metal or a plastic. The receptacle may be of any appropriate size and shape, but it is shown as having vertical walls and of substantially triangular horizontal section. The back wall 2 is of arcuate form, so as to substantially conform to the curved interior of a cooking pot in which, e. g., soup may be contained. The two side walls 3 and 4 converge from the back wall to the front wall 5 which is relatively narrow and exteriorly of this front wall is a spout 6 which extends for the full height of the receptacle.

The receptacle has a closed bottom 7 and that portion of its top adjacent the spout is closed by a convex hood 8. The top edge 9 of the receptacle back of the hood occupies the same horizontal plane as the top edge of the spout except at the extreme back of the cup where the edge of the receptacle is cut away to provide a liquid inlet 10. The lower edge of this inlet is appreciably below the plane of the upper edges of the receptacle and spout. The skimmer is provided with an appropriate handle 11 of any desired shape.

It will be noted, especially from Figures 2, 3 and 4 that the interior of the receptacle and the interior of the spout are isolated from one another except near the bottom of these parts, where there is provided in the front wall 5 a communicating opening 12 of the shape best shown in Figure 3. It will be there seen that the upper portion of this opening tapers or converges in an upward direction. This is important as will presently be explained. The lower portion of the opening is shown as tapering in a downward direction but this is not so important but convenient as it conforms to the shaping of the lower portion of the spout.

Figures 2 and 3 show the manner of using the skimmer of this invention. In Figure 2 I have indicated a body or mass of soup having on the surface thereof the usual accumulation of melted grease. The skimmer is adapted to be depressed into the liquid sufficiently to bring the lower edge of the liquid inlet opening 10 below the surface of the liquid, while the upper edges of the receptacle and spout remain above such surface. When the skimmer is thus positioned, the liquid will flow into the receptacle 1 through the inlet opening 10 as indicated by the arrows in this figure. The upper stratum of grease will flow into the receptacle with an attendant inflow of the soup stratum and this operation will continue until the receptacle 1 is either filled to the liquid level in the kettle or until the operator lifts the skimmer out of the liquid. In either event the soup and grease will stratify in the receptacle 1 and if any appreciable amount of liquid has flowed into the receptacle, this grease stratum will be appreciably above the outlet opening 12.

To discharge the contents of the receptacle, it is tilted, as shown in Figure 4, so as to permit the lower soup stratum to flow through the opening 12 and out of the spout. When the skimmer is thus tilted, the hood 8 will keep the liquid from slopping or running over the forward edge of the receptacle into or about the spout and will confine it in the receptacle so that it can only have egress through the discharge opening 12. Soup will thus flow through this outlet and out of the spout, as shown in Figure 4, and as the skimmer is tilted, the discharge will continue.

Meanwhile the elevation of the stratum of grease will be lowered until it reaches the discharge opening 12. If this discharge opening had a flat or substantially flat top, the grease, when it reached this opening, would flow out of the spout in the form of a flat film or ribbon which would cover substantially the entire width of the stream leaving the free end of the spout so that its presence would not be clearly apparent. However, the opening 12 tapers upwardly from its central portion to a relatively constricted dimension at its top. Consequently, when the grease reaches this constricted top, the base of the grease stratum will first flow through the constricted portion of the opening in a relatively narrow ribbon, indicated by the three darker lines in Figure 5, the lighter lines in this figure indicating the width of the entire stream.

A person watching the stream discharging from the spout can readily see the narrow ribbon of grease flowing with the broader ribbon of soup and will know at once that the pouring should be discontinued if the grease is to be separated. In practice, the grease indication thus provided makes possible a practically complete separation of the soup from the grease.

In a like manner milk and cream permitted to stratify in a receptacle before pouring, will show a narrow ribbon of cream on a broader ribbon of flowing milk which has a readily distinguishable darker color.

After the lower stratum has been discharged down to the upper stratum from which it is desired to separate it, said upper stratum may be removed from the receptacle by tilting the receptacle in the opposite direction, to pour out the grease or cream as the case may be. In handling soup the grease may be returned to the kettle if desired or may be disposed of in any appropriate way.

The back wall 2 of the receptacle has been described as curved to substantially fit the interior of a cooking pot or kettle. This has been found desirable in handling soups as the grease in soup tends to accumulate around its edges. When the skimmer is pressed down into the soup with its back wall 2 in engagement with the interior face of the kettle, the kettle wall serves to guide and steady the operations of the skimmer while the grease contiguous to such wall will readily flow through the inlet opening as indicated in Figure 2.

The substantially triangular shaping of the receptacle with its side walls diverging toward the spout facilitates the discharge of the maximum portion of the lower stratum before the upper stratum reaches the discharge opening 12.

The foregoing detailed description sets forth the invention in its preferred practical form, but the invention is to be understood as fully commensurate with the appended claims.

Having thus fully described the invention, what I claim as new and desire to secure by Letters Patent is:

1. A skimmer comprising a closed bottom receptacle provided at one side with a discharge spout, the interior of which is isolated from the interior of the receptacle except at a discharge opening near the bottom of the receptacle and spout, and a hood covering the top of the receptacle adjacent the spout, said receptacle being provided in its side remote from the spout with a liquid inlet at a lower elevation than the upper edges of the receptacle and spout, and a handle for manipulating said skimmer.

2. A skimmer comprising a closed bottom receptacle provided at one side with a discharge spout, the interior of which is isolated from the interior of the receptacle except at a discharge opening near the bottom of the receptacle and spout, and a hood covering the top of the receptacle adjacent the spout, the wall of the receptacle being provided remote from the spout with a cut out extending downwardly to an elevation appreciably below the upper edge of the remainder of the receptacle and the upper edge of the spout, and a handle for manipulating said skimmer.

3. A skimmer comprising a closed bottom receptacle provided at one side with a discharge spout, the interior of which is isolated from the interior of the receptacle except at a discharge opening near the bottom of the receptacle and spout, and a hood covering the top of the receptacle adjacent the spout, said receptacle being provided in its side remote from the spout with a liquid inlet at a lower elevation than the upper edges of the receptacle and spout, and a handle for manipulating said skimmer, the upper portion of the discharge opening being shaped so that its edges converge in an upward direction to a substantially attenuated dimension.

4. A skimmer comprising a closed bottom receptacle provided at one side with a discharge spout, the interior of which is isolated from the interior of the receptacle except at a discharge opening near the bottom of the receptacle and spout, and a hood covering the top of the receptacle adjacent the spout, said receptacle being provided in its side remote from the spout with a liquid inlet at a lower elevation than the upper edges of the receptacle and spout, and a handle for manipulating said skimmer, the upper portion of the discharge opening being shaped so that its edges converge in an upward direction to a substantially attenuated dimension and said receptacle being of upstanding substantially triangular prismatic form with the spout positioned at the apex thereof.

5. A skimmer comprising a closed bottom receptacle provided at one side with a discharge spout, the interior of which is isolated from the interior of the receptacle except at a discharge opening near the bottom of the receptacle and spout, and a hood covering the top of the receptacle adjacent the spout, said receptacle being provided in its side remote from the spout with a liquid inlet at a lower elevation than the upper edges of the receptacle and spout, and a handle for manipulating said skimmer, and said receptacle being of upstanding substantially triangular prismatic form with the spout positioned at the apex thereof.

6. A skimmer comprising a receptacle of upstanding substantially triangular prismatic form having a closed bottom, a spout extending along the apex of said receptacle for substantially the full height thereof with the interior of the spout isolated from the interior of the receptacle except at a discharge opening near the bottom of the receptacle and spout, said discharge opening having an attenuated upper portion, and a hood covering the top of the receptacle adjacent the spout, the upright wall of the receptacle remote from the spout being convex with its upper edge cut away to a point below the upper edges of the remainder of the receptacle and the spout.

GEORGE D. WHITE.